(12) United States Patent
Lahr

(10) Patent No.: US 11,225,886 B2
(45) Date of Patent: Jan. 18, 2022

(54) VALVE GEAR FOR A COMBUSTION ENGINE OF A MOTOR VEHICLE

(71) Applicant: Daimler AG, Stuttgart (DE)

(72) Inventor: Matthias Lahr, Schwaebisch Gmuend (DE)

(73) Assignee: Daimler AG, Stuttgart (DE)

(*) Notice: Subject to any disclaimer, the term of this patent is extended or adjusted under 35 U.S.C. 154(b) by 3 days.

(21) Appl. No.: 16/755,124

(22) PCT Filed: Sep. 21, 2018

(86) PCT No.: PCT/EP2018/075625
§ 371 (c)(1),
(2) Date: Apr. 9, 2020

(87) PCT Pub. No.: WO2019/072522
PCT Pub. Date: Apr. 18, 2019

(65) Prior Publication Data
US 2020/0325802 A1 Oct. 15, 2020

(30) Foreign Application Priority Data

Oct. 13, 2017 (DE) .................... 10 2017 009 535.3

(51) Int. Cl.
*F01L 13/00* (2006.01)
*F01L 1/047* (2006.01)
(Continued)

(52) U.S. Cl.
CPC .......... *F01L 13/0036* (2013.01); *F01L 1/047* (2013.01); *F01L 1/18* (2013.01); *F01L 13/06* (2013.01);
(Continued)

(58) Field of Classification Search
CPC ... F01L 1/181; F01L 1/18; F01L 1/053; F01L 1/182; F01L 1/047; F01L 1/267;
(Continued)

(56) References Cited

U.S. PATENT DOCUMENTS 6,314,926 B1 * 11/2001 Meneely ................. F01L 13/06
123/320
6,324,143 B1 11/2001 Fukuda
(Continued)

FOREIGN PATENT DOCUMENTS

DE         1 063 426 B    8/1959
DE    10 2013 019 000 A1  5/2015
(Continued)

OTHER PUBLICATIONS

PCT/EP2018/075625, International Search Report dated Dec. 11, 2018 (Two (2) pages).
(Continued)

*Primary Examiner* — Charles G Freay
*Assistant Examiner* — Kelsey L Stanek
(74) *Attorney, Agent, or Firm* — Crowell & Moring LLP

(57) ABSTRACT

A valve gear has a cam shaft with a firing cam and a braking cam. A first cam follower is allocated to the firing cam with the first cam follower being provided in a firing operation for actuating a gas exchange valve. A second cam follower is allocated to the braking cam with the second cam follower being provided in a braking operation for actuating the gas exchange valve. A changeover device switches between the operations and has a tilting lever mount having a pivotably mounted mounting element on which a tilting lever belonging to the first cam follower and a tilting lever belonging to the second cam follower are pivotably mounted. The tilting lever mount has two mounting screws respectively having a
(Continued)

ball head and the ball heads each form a ball joint together with a ball head receiver of the allocated tilting lever.

6 Claims, 13 Drawing Sheets

(51) Int. Cl.
    *F01L 1/18*       (2006.01)
    *F01L 13/06*     (2006.01)
    *F01M 9/10*      (2006.01)
    *F16H 25/14*     (2006.01)

(52) U.S. Cl.
    CPC ............... *F01M 9/10* (2013.01); *F16H 25/14* (2013.01); *F01L 2305/00* (2020.05)

(58) Field of Classification Search
    CPC ......... F01L 2001/186; F01L 2001/0473; F01L 2001/0476; F01L 13/0036; F01L 13/00; F01L 13/06; F01L 13/065; F01L 2105/00
    USPC .................................. 123/90.33, 90.39, 90.4
    See application file for complete search history.

(56) References Cited

U.S. PATENT DOCUMENTS

| 6,732,686 | B1 * | 5/2004 | Maeda | F01L 1/18 |
| | | | | 123/321 |
| 8,851,048 | B2 * | 10/2014 | Meistrick | F01L 13/065 |
| | | | | 123/321 |
| 2014/0130774 | A1 * | 5/2014 | Le Forestier | F02D 9/06 |
| | | | | 123/321 |

FOREIGN PATENT DOCUMENTS

| DE | 102013019000 A1 * | 5/2015 | ............. F01L 13/06 |
| EP | 1 279 797 A1 | 1/2003 | |
| EP | 1279797 A1 * | 1/2003 | ............. F01L 1/183 |
| GB | 2193 997 A | 2/1988 | |
| JP | 53-109507 U | 9/1978 | |

OTHER PUBLICATIONS

German Search Report issued in German application No. 10 2017 009 535.3 dated Jun. 26, 2018, with Statement of Relevancy (Eight (8) pages).

* cited by examiner

VALVE GEAR FOR A COMBUSTION ENGINE OF A MOTOR VEHICLE

BACKGROUND AND SUMMARY OF THE INVENTION

The invention relates to a valve gear for a combustion engine of a motor vehicle, in particular a utility vehicle.

A valve gear having at least one cam shaft, which has at least one cam group having at least one firing cam and at least one braking cam, is already known from DE 10 2013 019 000 A1, having at least one cam follower allocated to the firing cam, the cam follower being provided in a firing operation for actuating at least one gas exchange valve, and a cam follower allocated to the braking cam, the cam follower being provided in a braking operation for actuating the at least one gas exchange valve, and having a changeover device, which is provided to switch between the firing operation and the braking operation. The changeover device is provided to convert a torsional moment of the cam shaft into a force for switching between the firing operation and the braking operation.

The known embodiment of the valve gear constitutes a purely mechanical switching between two different valve elevations. The cam followers are functionally allocated to a certain valve elevation, i.e., one cam follower for the fired elevation and another for the braking elevation. The mounting of the cam followers takes place on a common tilting lever axis, which is additionally rotatably mounted in the engine housing. The cam followers themselves are mounted on this axis with a central offset in relation to the rotational axis of the tilting lever axis, such that it leads to a shifting of the tilting lever central axes relatively to the cam shaft axis, when the tilting lever axis is rotated. This rotation causes a counter shifting of the tilting lever mount, such that this alternately comes into contact with the cam shaft. Thus, a switching between different valve elevations is achieved, which are independent of one another and do not have to have a base circle phase.

The synchronous rotation of the tilting lever axis at a certain control point in time is caused by the cam elevation of a cam follower itself, i.e., the mounting force generates a corresponding shifting moment on the tilting lever axis, by means of which this is correspondingly rotated. Since the cam elevation is constant, the tilt lever axis is also hamioniously and continuously adjusted. In addition, the adjustment to the same time interval takes place, in which a regular valve elevation would take place. Switching between the two cam profiles takes place via the unlocking of the end position of the tilting lever axis. In the event of a triggered unlocking, with the next cam elevation, a rotation, which is carried out until reaching the opposite end position and again automatically stops the locking, takes place.

The triggering of the switching process, i.e., the unlocking of the tilting lever axis, is ensured by a cam shaft-synchronous triggering device. This is constructively designed in such a way that the control point in time for switching there and back is shifted by the length of half of the cam elevation. Thus, it is achieved that, when switching from the fired mode, the opening flank of the switching cam used as such of a valve elevation causes the rotation of the tilting lever axis into the braking mode and, corresponding to the down-switching, the closing flank thereof as the switching cam used as such of a valve elevation causes the back-rotation into the fired mode, wherein here either the cam elevation of the braking profile or a return spring causes the corresponding moment on the tilting lever axis.

The object of the invention, in particular, is to provide an advantageously flexible and reliable valve gear.

The invention is based on valve gear having at least one cam shaft, which has at least one cam group having at least one firing cam and at least one braking cam, having at least one cam follower allocated to the firing cam, the cam follower being provided in a firing operation for actuating at least one of the gas exchange valves, and a cam follower allocated to the braking cam, the cam follower being provided in a braking operation for actuating at least one gas exchange valve, and having a changeover device, which is provided to switch between the firing operation and the braking operation. The changeover device has a tilting handle mount having a pivotably mounted mounting element, on which tilting levers belonging to the cam followers are pivotably mounted.

It is provided that the tilting lever mount has two mounting screws each having a ball head, and the ball heads of the mounting screws each form a ball joint together with a ball head receiver of the allocated tilting lever, via which ball joint the corresponding tilting lever is mounted on the tilting lever mount. Preferably, the changeover device is provided to convert a torsional moment of the cam shaft into a force for switching between the firing operation and the braking operation. Thus, the torsional moment and/or the rotational movement of the cam shaft can be used, whereby an actuator system, which provides the force for switching, for example in form of a hydraulic pressure, is no longer necessary. The changeover device is preferably provided for a direct switching between the firing operation and the braking operation for an adjustment of a position of the cam follower. Preferably, the changeover device is provided for a direct switching between the firing operation and the braking operation for an adjustment of the positions of the rotational axes of the cam follower. As a result of the design of the valve gear according to the invention, a mounting of the tilting lever that is particularly independent of position and almost frictionless, in particular, can be achieved. By using a ball joint, the cam followers can abut on the corresponding firing cams or braking cams without an angle offset, such that a punctuate load between cams and cam followers can be avoided, whereby the lifetime can be increased. Furthermore, the friction in a ball joint is particularly minimal.

Here, "cam group" is to be understood as a group of cams, which comprises all the cams provided for one cylinder of the combustion engine, A "firing operation" is be understood, in particular, as a control of the gas exchange valves for a fired operation. A "braking operation" is to be understood, in particular, as a control of the gas exchange valves for a braking operation, in which a compressive action is used inside the cylinder for the braking operation. Here, the firing operation and the braking operation differ, in particular, in terms of control times for the gas exchange valves. In this context, a "changeover device" is to be understood, in particular, as a mechanism which is provided for switching between the firing operation and the braking operation. "Provided" is in particular to be understood as specially configured and/or equipped.

Furthermore, it is provided that the mounting element s provided for receiving the mounting screws, and the mounting screws are respectively formed to be adjustable for setting the valve play relative to the mounting element. Thus, a particularly compact design of the changeover device is advantageously possible.

Furthermore, it is provided that the mounting screws each have an oil channel, and the oil channels are connected to a motor-sided pressure oil supply, and an oil supply line is provided in the ball head receiver, and the oil supply line is in superposition with the oil channel. Advantageously, an oil supply of the tilting lever via the pressure oil supply, the oil channels and the oil supply line into the tilting levers can be guaranteed, and a separate oil supply is not necessary.

It is furthermore provided that the tilting levers respectively have a stopping element, and the stopping element is formed from a spring-loaded ball facing towards the allocated mounting screws, and the stopping element is provided in the ball head receiver along with the oil supply line in the tilting lever. Preferably, the stopping element is integrated in the tilting lever, such that a separate device, for example in the form of a spring acting as a tilting lever, is no longer necessary, whereby a particularly compact device emerges, which can stop the respectively non-actuated tilting lever in a firing operation or in a braking operation.

It is further provided that, in a stopping state of the stopping element, the stopping element is latched into an end of the oil channel facing away from the tilting lever and here covers the oil channel. In a stopping state, the respective tilting levers with their respective cam followers are not in contact with the respective cams, such that the corresponding gas exchange valves are not actuated by the tilting lever in the stopping state, whereby an oil supply is not necessary and the oil provision to the tilting lever is interrupted by the stopping element. Advantageously, an oil flow rate is reduced with the stopping element along with the stopping of a tilting lever not in operation.

In addition, it is provided that the mounting screws on the end of the oil channel on the respective ball head have a conical extension, opening outwards, of the oil channel, Advantageously, a superimposition of the oil channel and the oil supply line is present with the conical extension of the respective tilting levers in a fired operation and in a braking operation in the event of a corresponding pivoting movement of the tilting levers, such that an oil supply is ensured, furthermore, there is a secure latching of the stopping element in which the oil channel is extended.

Further advantages arise from the following description of the Figures. An exemplary embodiment of the invention is depicted in the Figures. The Figures, the description of the Figures and the claims contain numerous features in combination. The person skilled in the art will also necessarily consider the features individually and will integrate them into further worthwhile combinations.

DETAILED DESCRIPTION OF THE DRAWINGS

Figure 1:
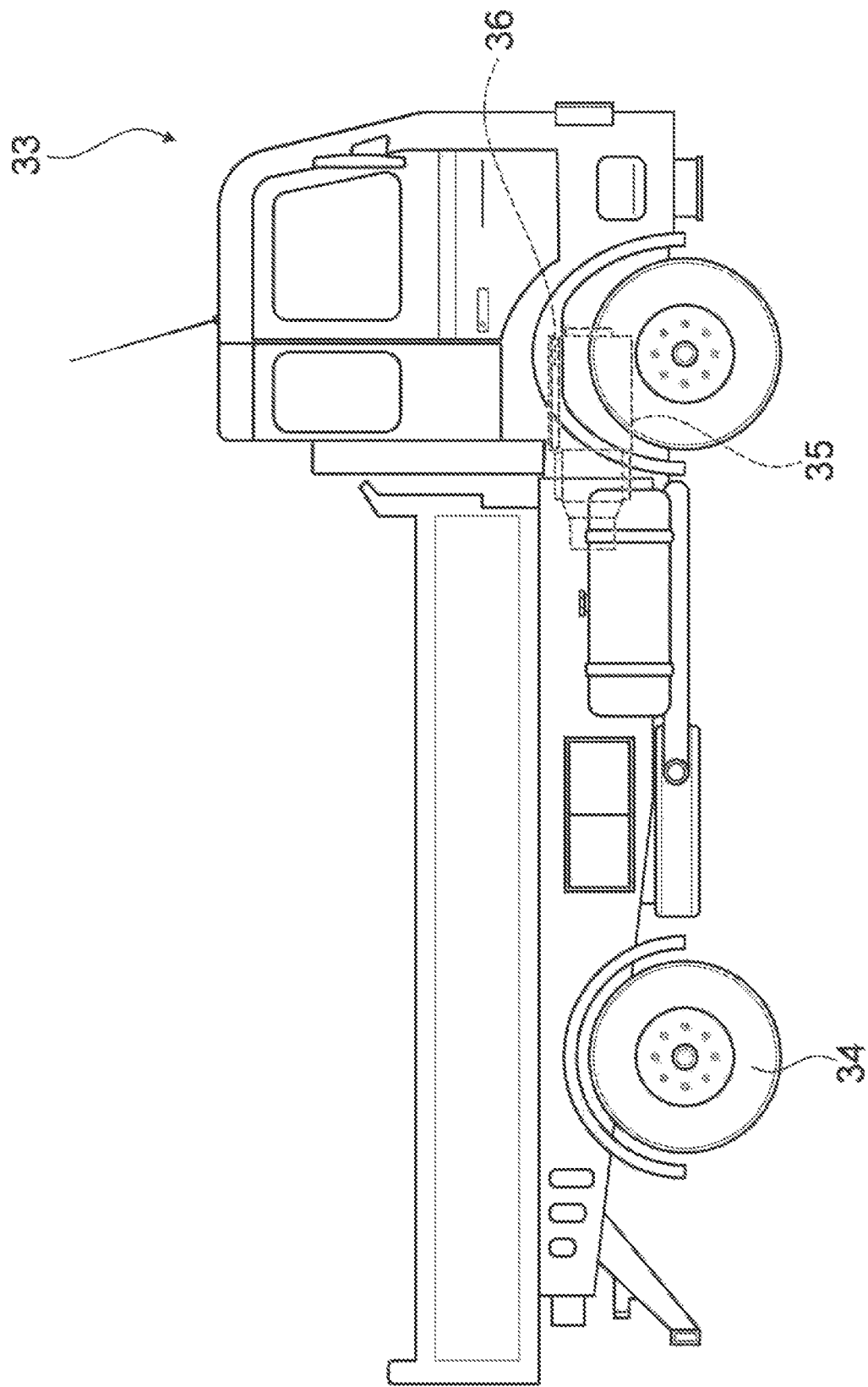
FIG. 1 is a schematic depiction of a motor vehicle having a valve gear according to the invention.

FIG. 1 schematically shows a motor vehicle 33. The motor vehicle 33 is formed from a utility vehicle, in particular from a heavy goods vehicle (HGV). However, in principle, a different design of the motor vehicle 33 that also seems reasonable to the person skilled in the art would also be conceivable. The motor vehicle 33 comprises a drive train, via which drive wheels 34 of the motor vehicle 33 can be driven. The drive train comprises a combustion engine 35. Furthermore, the motor vehicle 33 has a multi-stage transmission not labelled in more detail. The combustion engine 35 has a driven crankshaft, which is connected to a transmission gear element of the multi-stage transmission. The multi-stage transmission forms a part of the drive train of the motor vehicle 33. The combustion engine 35 comprises at least one valve gear 36. The combustion engine 35 preferably comprises several valve gears 36. The combustion engine 35 is provided to convert chemical energy into kinetic energy, which serves, in particular, to propel a motor vehicle 33.

FIGS. 2 to 13 show the valve gear 36 of the combustion engine 35. The valve gear 36 comprises a cam shaft 10, which is provided for a firing operation and a braking operation. The cam shaft 10 is designed as an outlet cam shaft. The cam shaft 10 is provided to actuate gas exchange valves 15, 16 for cylinders of the combustion engine 35, the cylinders not being depicted in more detail.

In the exemplary embodiment depicted, the combustion engine 35 comprises two gas exchange valves 15, 16 per cylinder, the gas exchange valves being formed as outlet valves. The cam shaft 10 comprises at least one cam group having a firing cam 11 and a braking cam 12. The cam shaft 10 comprises one cam group per cylinder for actuating the two gas exchange valves 15, 16. In the exemplary embodiment, only the firing cam 11 and the braking cam 12 of a cylinder 12 are depicted. Further cylinders not depicted in more detail have analogously formed cams.

Furthermore, the combustion engine 35 comprises at least one further gas exchange valve per cylinder, the gas exchange valve being formed as an inlet valve and being actuated by a further valve drive. Two inlet valves are preferably provided for each cylinder, the inlet valves being actuated by an inlet cam shaft. The further valve gear and the inlet valves are not depicted in more detail in the Figures.

The gas exchange valves 15, 16 and the inlet valves are received in a known manner in a cylinder head, not depicted in more detail, of the combustion engine.

The firing cam 11 is provided to open the gas exchange valves 15, 16 in a firing operation. The braking cam 12 is provided to open at least one of the gas exchange valves 15, 16 in a braking operation. The firing cam 11 and the braking cam 12 have different cam curves. The cam curve of the firing cam 11 has an elevation, which is provided, in particular, to open the gas exchange valves 15, 16, while a piston in the corresponding cylinder is moved from a lower dead point into an upper dead point in order to discharge exhaust gas via the gas exchange valves 15, 16 from the cylinder in a discharge cycle. The cam curve of the braking can 12 is at least provided to open at least one of the gas exchange valves 15, 16 after the piston in the corresponding cylinder was moved from the lower dead point into the upper dead point in order to here emit compressed air or combustion air in a compression cycle via the at least one gas exchange valve 15, 16. The combustion air is let into the cylinder before the compression cycle in a suction cycle via the inlet valves. The engine braking effect emerges as a result of emitting compressed combustion air at the end of the compression cycle, which can no longer be used in the subsequent work cycle for accelerating a piston from the upper dead point to the lower dead point. The cam curve, depicted in FIGS. 2 to 13, of the braking cam 12 of the engine braking device according to the invention has two elevations, for example. Here, the elevations are formed as braking elevations and/or boost charging elevations. The valve gear 36 depicted in FIGS. 2 to 14 is thus designed as a 2-stroke engine brake with boost charge. Of course, the valve gear 36 for a braking operation can also be designed as a 4-stroke engine brake having only one braking elevation and an optional boost charging elevation. The functionality and effect of the braking and boost charging cams are not explained in more detail, since they are adequately known from the prior art.

The valve gear 36 has a cam follower 13 allocated to the firing cam 11, the cam follower being provided in a firing operation for actuating the gas exchange valves 15, 16. Furthermore, the valve gear 36 has a cam follower 14 allocated to the braking cam 12, the cam follower being provided in a braking operation for actuating one of the gas exchange valves 15, 16. In the exemplary embodiment shown according to FIGS. 2 to 14, only the gas exchange valve 16 is actuated in the braking operation. The cam follower 13 which is provided for the firing operation is here only provided for an effective connection to the firing cam 11. The cam follower 14, which is provided for the braking operation, is only provided for the effective connection with the braking cam 12.

Furthermore, the valve gear 36 has a changeover device 17, which is provided to switch between the firing operation and the braking operation. The changeover device 17 is provided to switch between an actuation of the two gas exchange valves 15, 16 by means of the firing cam 11 and an actuation of the individual gas exchange valve 16 by means of the braking cam 12. Here, the changeover device 17 is provided to switch backwards and forwards between a tab of the can curve of the firing cam 11 by means of the allocated cam follower 13 and a tap of the cam curve of the braking cam 12 by means of the allocated cam follower 14. The changeover device 17 is only provided for switching the actuation of the gas exchange valves 15, 16 of the one cylinder. For the further cylinders, the valve gear 36 can, in principle, have further analogously formed changeover devices.

The valve gear 36 comprises two tilting levers 22, 23 allocated to the cylinder. In each case, the cam followers 13, 14 are allocated to the tilting levers 22, 23. The engine braking device comprises two tilting levers 22, 23 respectively having one of the cam followers 13, 14. The tilting levers 22, 23 can each be pivoted around a tilting lever axis 24, 25 set by a tilting lever bearing 21 for actuating the gas exchange valves 15, 16. The one tilting lever 22 is provided for the firing operation and has the cam follower 13, which is provided for the effective connection to the firing cam 11. The other tilting lever 23 is provided for the braking operating and has the cam follower 14, which is provided for the effective connection to the braking cam 12. The tilting lever 22 provided for the braking operation acts on the two gas exchange valves 15, 16. In the exemplary embodiment shown, the tilting lever 23 provided for the braking operation only acts on the one gas exchange valve 16, yet can, in principle, also act on the two gas exchange valves 15, 16. In the exemplary embodiment shown according to FIGS. 1 to 14, the tilting lever 23 in the braking operation acts on the gas exchange valve 16 via a slide shoe 37 mounted in the tilting lever 22 in a longitudinally shiftable manner. The two tilting levers 22, 23 are separated from each other in a movement technical manner. Depending on whether the firing operation or the braking operation is switched, the cam shaft 10 actuates the corresponding tilting lever 22, 23 while the other tilting lever 22, 23 is decoupled from the cam shaft 10.

The firing cam 11 is positioned on the cam shaft substantially centrally between the two gas exchange valves 15, 16 in the axial extension. Furthermore, the tilting lever 22 is designed to be divided on its end opposite the cam follower 13, such that each of the two ends 22.1, 22.2 of the tilting lever 22 can each actuate one of the two gas exchange valves 15, 16. Here, the end 22.1, allocated to the gas exchange valve 15, of the tilting lever 22 is in direct contact with the gas exchange valve 15, while the end 22.1, allocated to the gas exchange valve 16, of the tilting lever 22 can act on the gas exchange valve 16 via the slide shoe 37. To do so, the end 22.1 has a bore 22.3, in which the slide shoe 37 is received in a longitudinally moveable manner. The slide shoe 37 has a head 37.1, which passes into a shaft 37.3 via a section 37.2. The shaft 37.3 is received in the bore 22.3 in a longitudinally moveable manner, wherein the end 22.2 of the tilting lever 22 is supported on the section 37.2 during a lifting movement of the tilting lever 22 in the firing operation and passes the stroke of the firing cam 11 onto the gas exchange valve 16 via the head 37.1. A cap 54 can be provided between the head 37.1 and the gas exchange valve 16, the cap being placed onto an end 16.1 of the gas exchange valve 16. The slide shoe 37 can have a securing element 37.4 on its shaft 37.3 opposite the head 37.1, which securing element prevents the slide shoe 37 falling out of the bore 22.3 when mounting the tilting lever 22. Advantageously, the forked tilting lever 22 is designed to be substantially symmetrical as a result of the central arrangement of the firing cam 11 between the two gas exchange valves 15, 16, based on the two ends 22.1, 22.2 of the tilting lever and the firing cam 11, such that the two ends 22.1, 22.2 substantially have the same removal from firing cams 11, whereby an equal load of the tilting lever 22 is made possible, and a tilting moment of the cam shaft 10 is avoided.

The braking cam 12 is positioned to be spaced apart from the firing cam 11 on the cam shaft 10 substantially in alignment with the gas exchange valve 16 perpendicular to the rotational axis 40 of the cam shaft 10. As a result, the tilting lever 23 can be designed to be substantially straight, such that an input by transverse forces onto the valve gear 36 can be avoided, whereby a wear-resistant operation is possible. In the braking operation, the tilting lever 23 causes a lifting of the braking cam 12 onto the gliding shoe 37 via a transmission element 55 on the end 23.1 of the tilting lever 23. The transmission element 55 is fixedly connected to the tilting lever 23, The longitudinally moveable glide shoe 37 glides in the bore 22.3 of the tilting lever 22 not actuated in the braking operation when transferring the lift of the braking cam 12 in the direction of the gas valve 16 and back.

The changeover device 17 is provided to convert a torsional moment 10 into a force for switching between the firing operation and the braking operation. The changeover device 17 comprises an actuator not depicted in more detail for controlling by means of a control and regulation unit not depicted in more detail, by means of which actuator the switching can be triggered. Apart from the actuator, which is only provided for triggering the switching, the changeover device 17 is formed completely mechanically.

The cam shaft 10 has a separate switching cam 20. The switching cam 20 is different from the firing cam 11 and the braking cam 12. The switching cam 20 is formed axially shiftably in relation to the firing cam 11 and the braking cam 12 and forms a separate cam contour 18. The switching cam 20 rotates with the cam shaft 10. The switching cam 20 is allocated to the changeover device 17. The switching cam 20 forms an active part of the changeover device 17. The switching cam 20 is coupled to the actuator that is no longer visible, which is provided for triggering the switching. The actuator is controlled by a computing unit of the changeover device 17, the computing unit no longer being visible. The computing unit of the changeover device 17 is formed from a part of the vehicle electronic system of the motor vehicle 33. The switching cam 20 is moveable axially along the cam shaft 10 via the actuator. For this, the switching cam 20 is guided in a longitudinal groove 10.1 of the cam shaft 10. The cam shaft 10 can be substantially designed to be tubular for a shifting of the switching cam 20 along the cam shaft 10 and forms a hollow space 10.2. The longitudinal groove 10.1 here penetrates the cam shaft 10, wherein the switching cam 20 having a positioning element 20.1 is received in the longitudinal groove 10.1. For example, an actuator can engage on the positioning element 20.1 in the hollow space 10.2 of the cam shaft 10 and can shift the switching cam 20 in the longitudinal groove 10.1. The switching cam 20 has two switching positions, wherein a first switching position is allocated to the firing operation and a second switching position is allocated to the braking operation. The cam contour 18 of the switching cam 20 is provided in at least one operating state to act directly on the switching element 19 of the changeover device 17, which is provided for a direct switching between the firing operation and the braking operation. The changeover device 17 has the switching element 19. The switching element 19 is rotatably mounted, wherein the valve gear 36 is in the firing operation or in the braking operation independently of a pivoting position of the switching element 19. The switching cam 20 is provided for a direct rotation of the switching element 19. To do so, the switching element 19 is rotated via the rotation of the cam shaft 10. A mounting axis 41 of the switching element 19 extends in parallel to the rotational axis 40 of the cam shaft 10. The mounting axis 41 of the switching element 19 is arranged next to the rotational axis 40 of the cam shaft 10. The switching element 19 is contacted by the switching cam 20 for a rotation of the switching element 19 and directly rotated.

Figure 2:
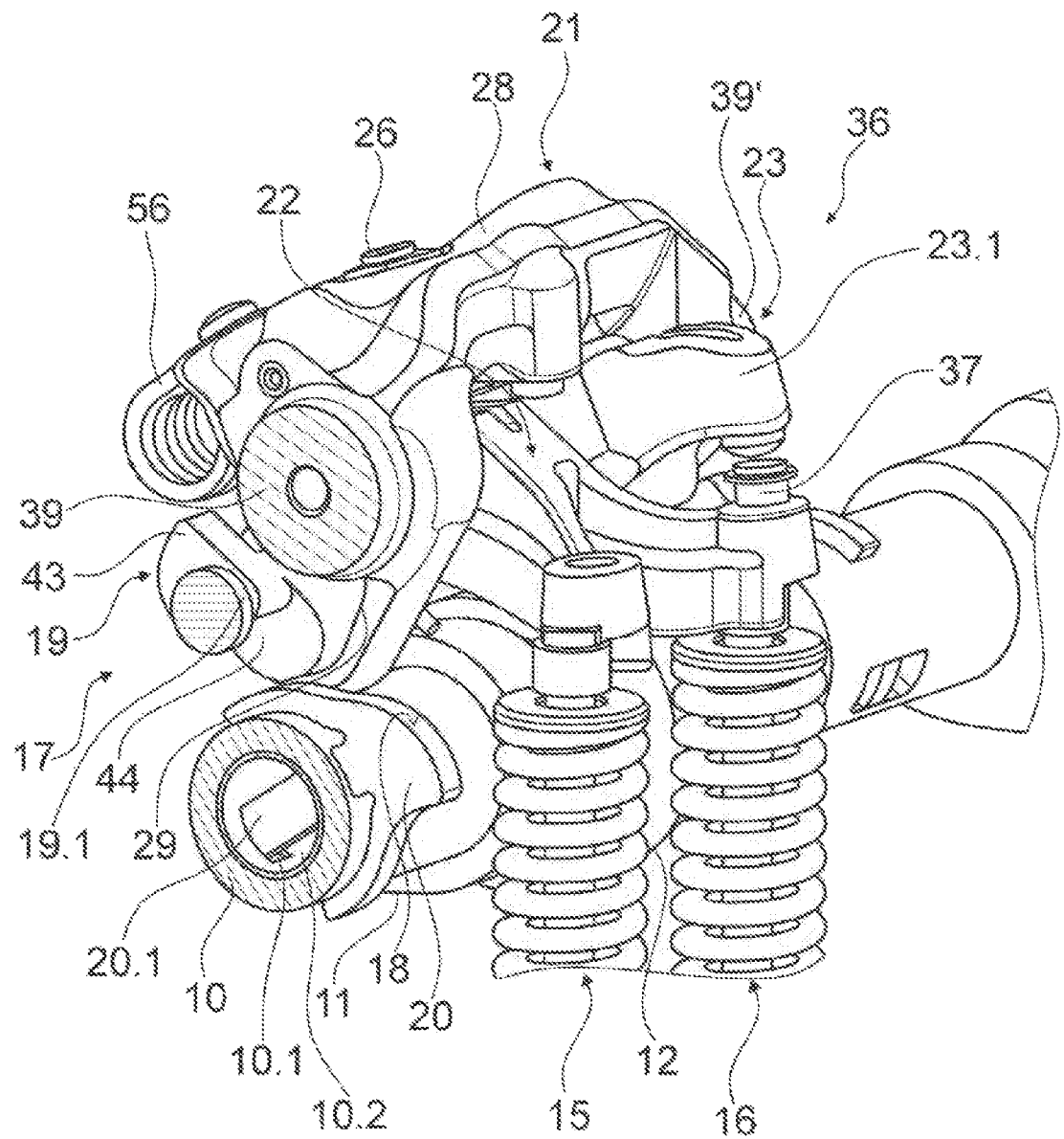
FIG. 2 is a perspective depiction of the valve gear according to the invention in a fired operation from the front.
Figure 3:
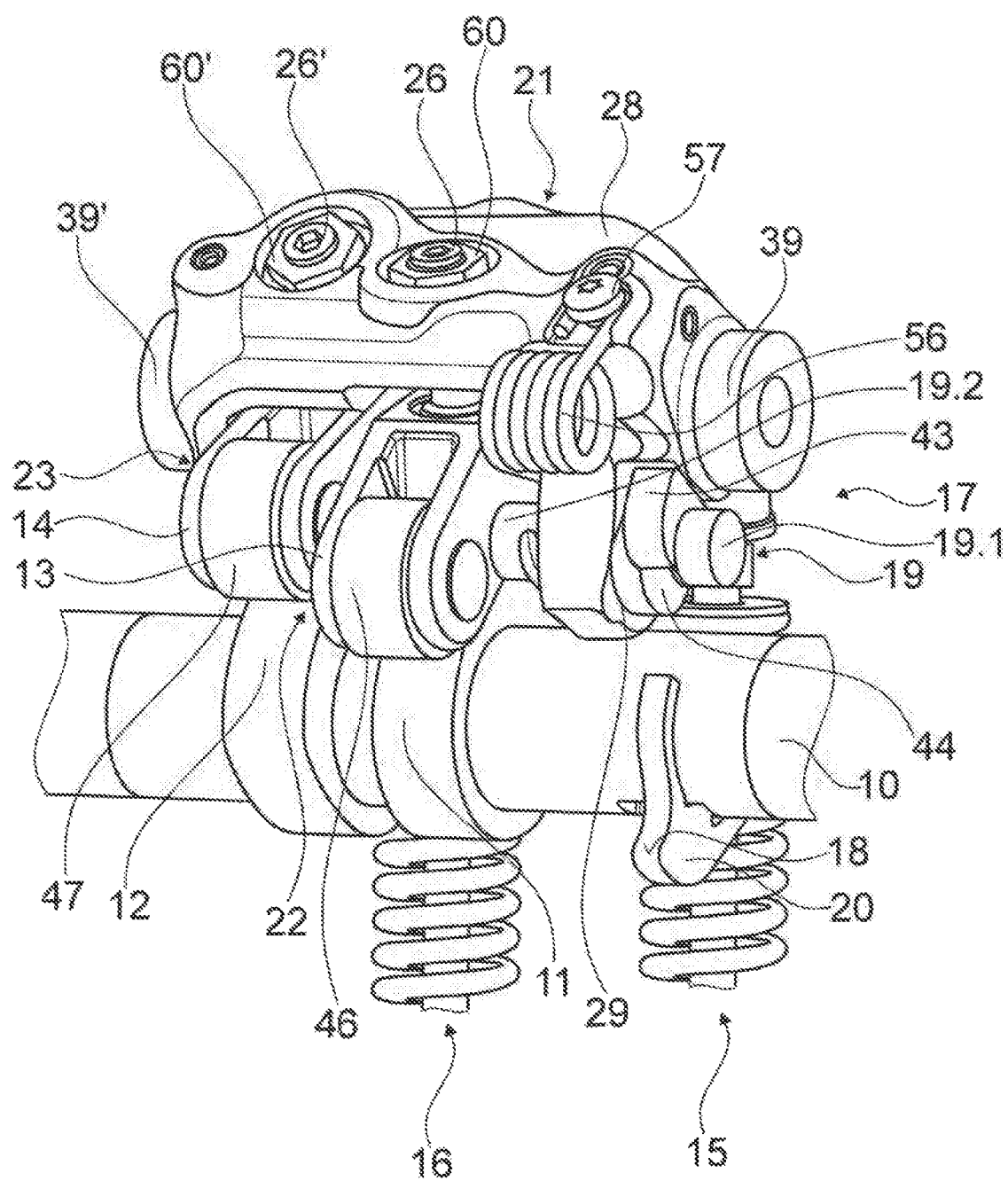
FIG. 3 is a perspective depiction of the valve gear according to the invention in a fired operation from the back.
Figure 4:
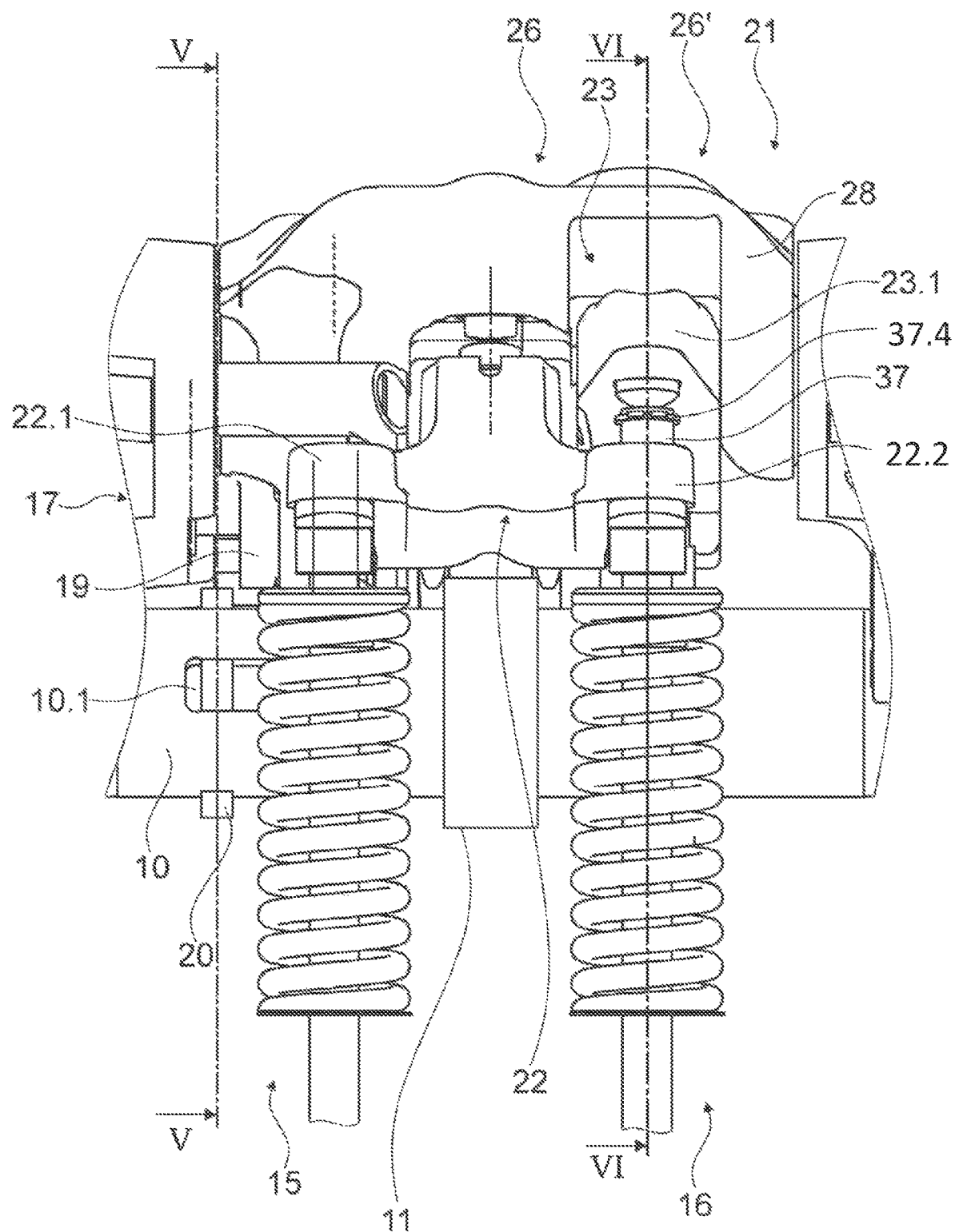
FIG. 4 illustrates the valve gear in a firing operation in a front view.
Figure 5:
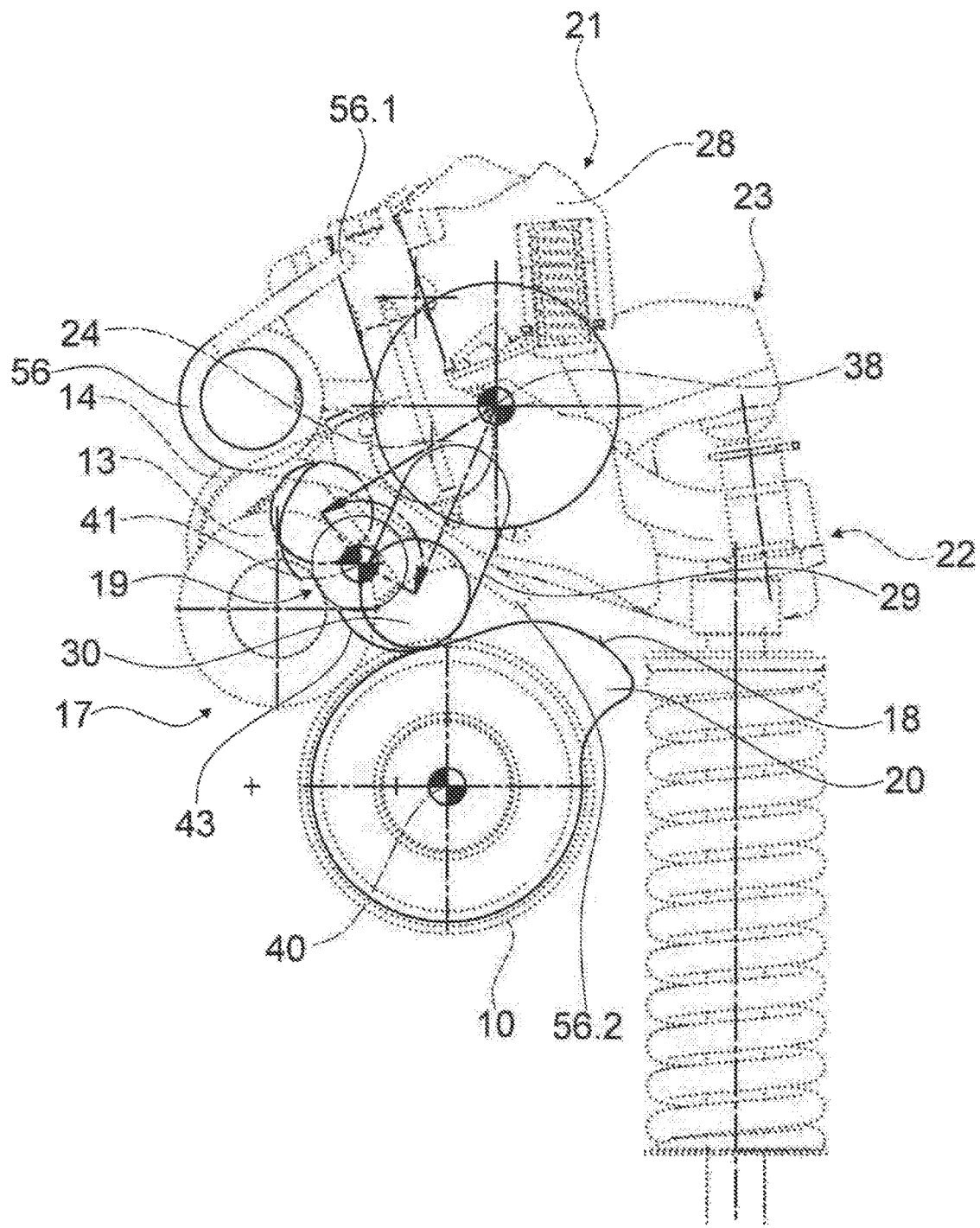
FIG. 5 is a partial cut-out of the valve gear in a fired operation in a cross-section long the line of intersection V-V.
Figure 7:
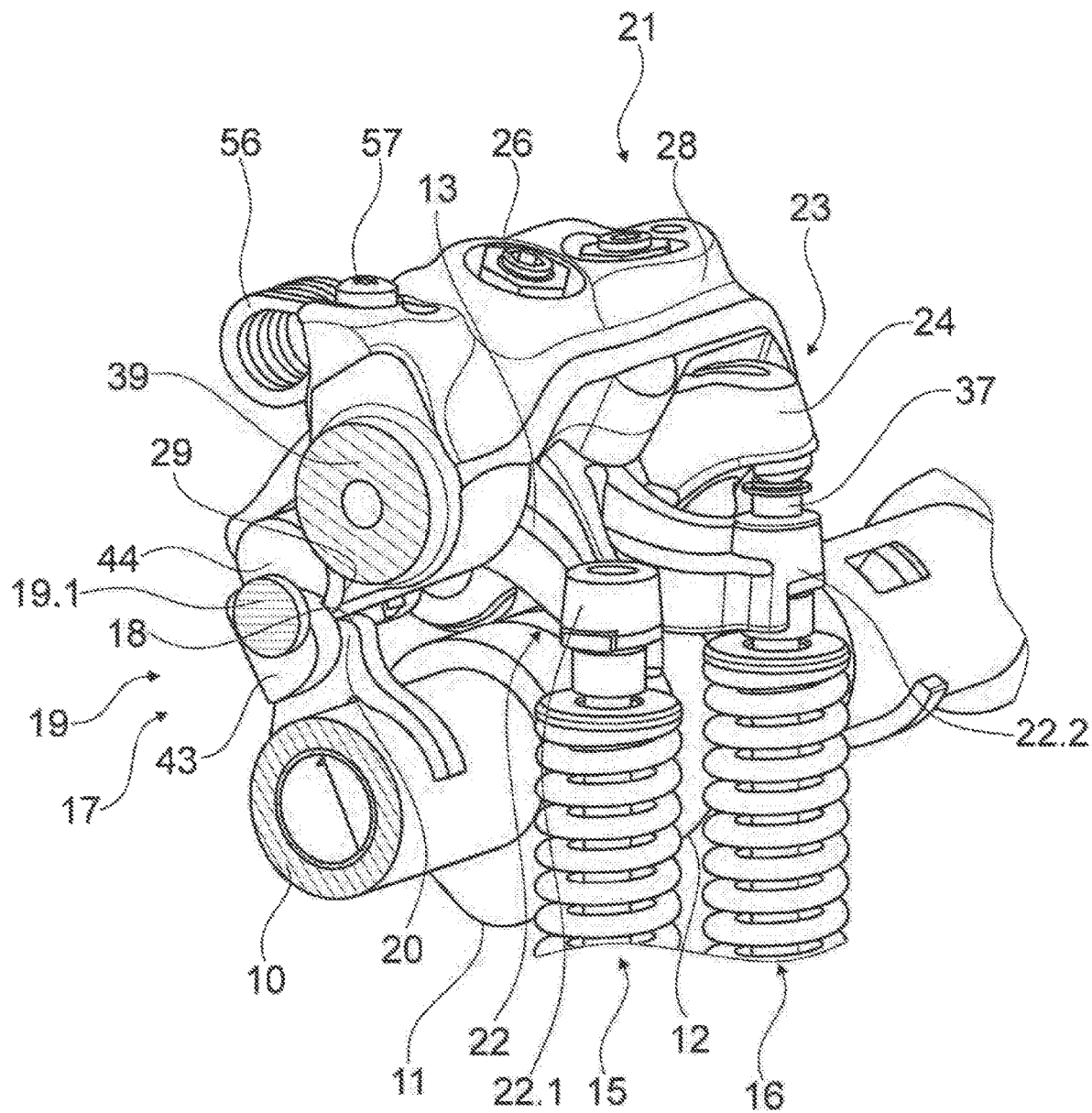
FIG. 7 is a perspective depiction of the valve gear according to the invention in a braking operation from the front.
Figure 8:
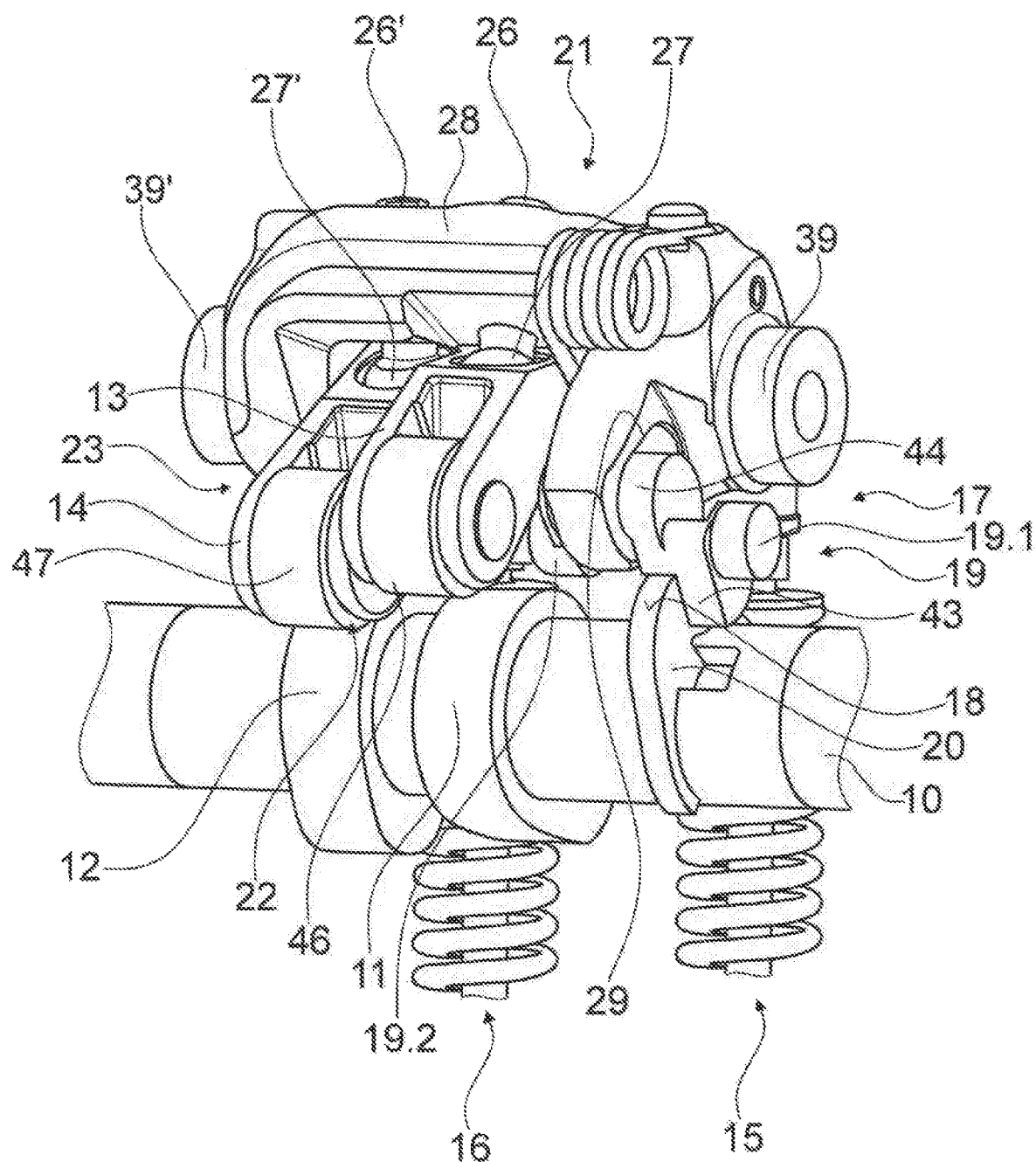
FIG. 8 is a perspective depiction of the valve gear according to the invention in a braking operation from the back.
Figure 9:
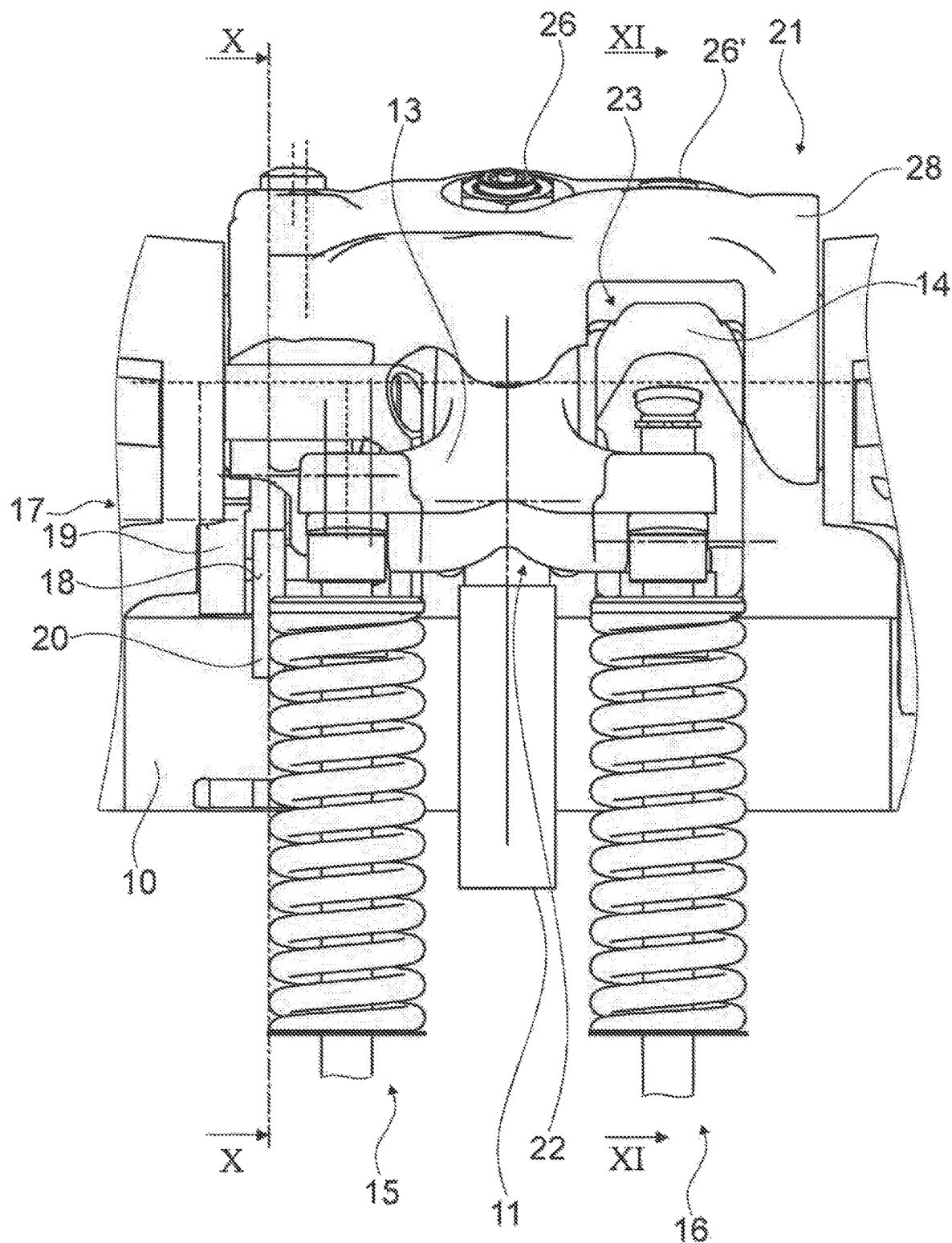
FIG. 9 illustrates the valve gear in a braking operation in a front view.
Figure 10:
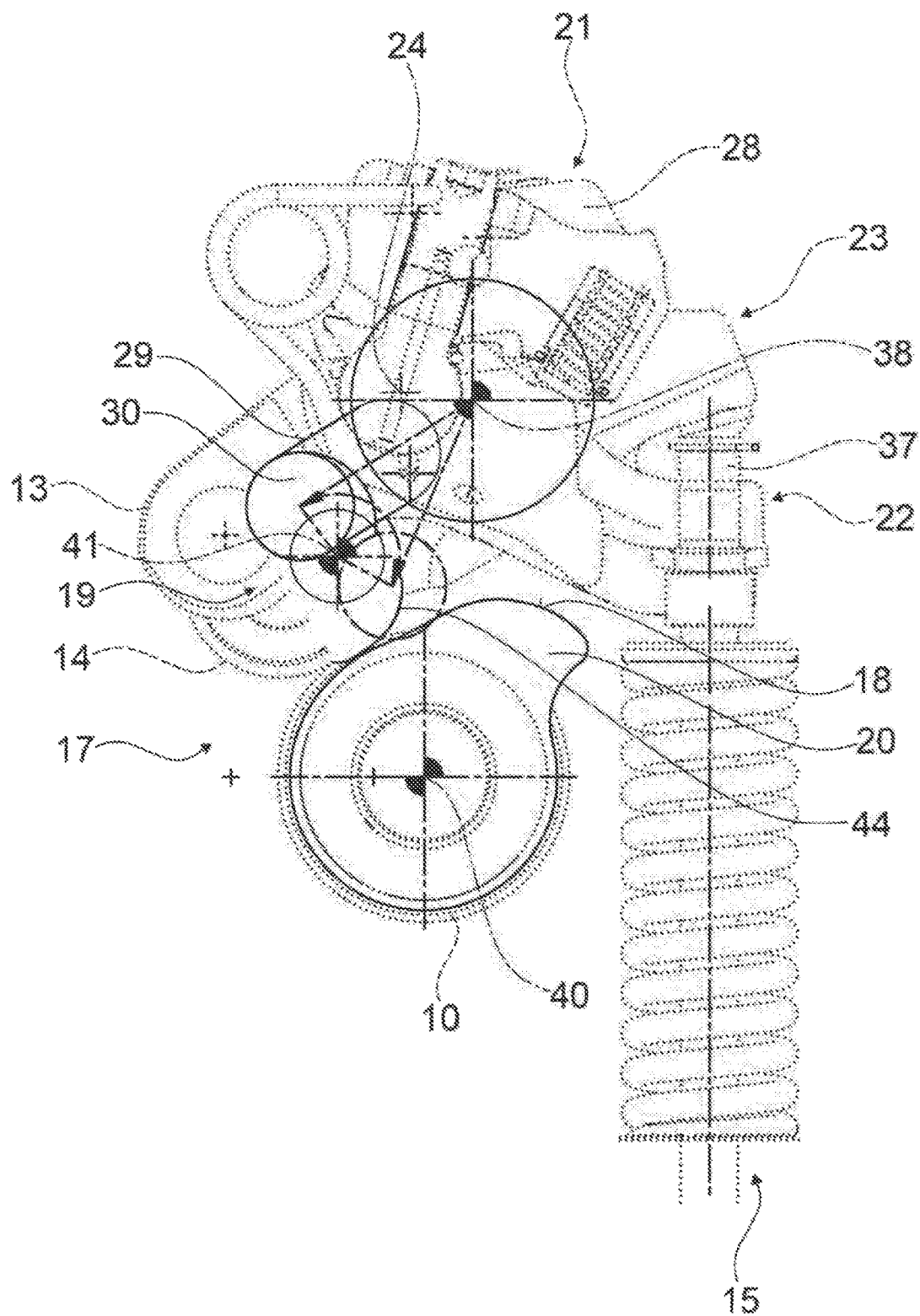
FIG. 10 is a partial cut-out of the valve gear in a braking operation in a cross-section along the line of intersection X-X.
Figure 13:
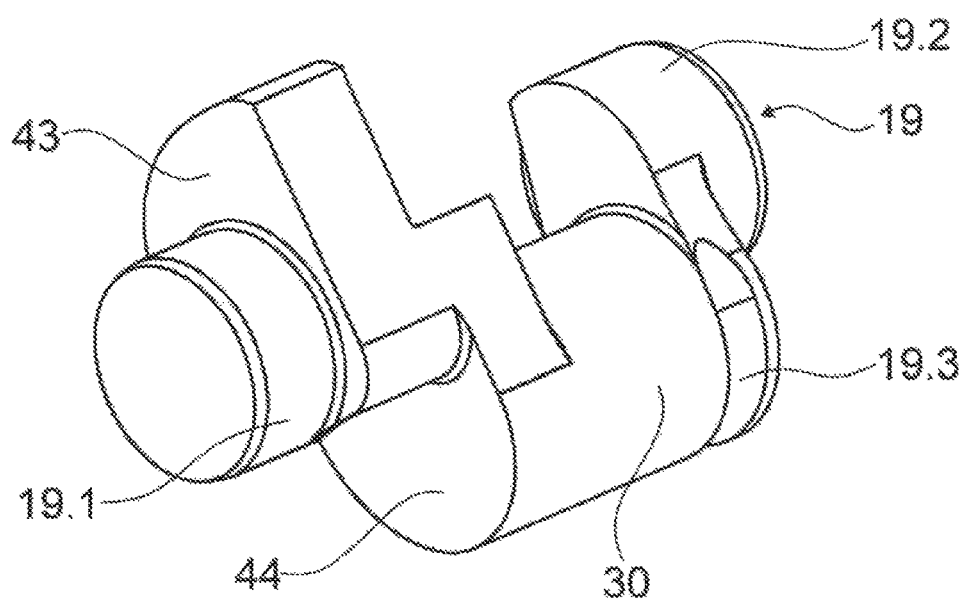
FIG. 13 illustrates a switching element of the changeover device of the valve gear according to the invention in a perspective depiction.

The switching element 19 of the changeover device 17 is formed from a switching eccentric shaft. The switching element 19 has a switching portion 30 that is eccentric in relation to the mounting axis 41. The switching element 19 is here formed in the manner of a crankshaft in the region of the eccentric switching portion 30. Furthermore, the switching element 19 has two switching cams 43, 44, which are provided for an adjustment of the switching element 19. The first switching cam 43 is here allocated to the firing operation, and the second switching cam 44 is allocated to the braking operation. The switching cams 43, 44 are arranged one next to other. However, in principle, it would also be conceivable that the switching cams 43, 44 are spaced apart from one another. The first switching cam 43 is arranged in a plane perpendicular to the rotational axis 40 of the cam shaft 10, in which the switching cam 20 is also in the first switching position. The second switching cam 44 is arranged in a plane perpendicular to the rotational axis 40 of the cam shaft 10, in which the switching cam 20 is also in the second switching position. The switching element 19 is adjusted via the switching cams 43, 44, wherein the switching element 19 is in turn provided for further transferring a switching movement via the eccentric switching portion 30. If the switching cam 20 is in a first switching position and if the valve gear 36 is in a braking operation, the first switching cam 43 is in an orbit of the switching cam 20 and is contacted during a rotation of the switching cam 20 and shifted out of an orbit of the switching cam 20. The switching element 19 is brought into a firing operation position. If the switching cam 20 is in a first switching position and if the valve gear 36 is in a firing operation, the switching cam 20 and the first switching cam 43 are contactless. If the switching cam 20 is in a second switching position and if the valve gear 36 is in a firing operation, the second switching cam 46 is in an orbit of the switching cam 20 and is contacted during a rotation of the switching cam 20 and shifted out of an orbit of the switching cam 40. The switching element 19 is brought into a braking operation position. If the switching cam 20 is in a second switching position and if the valve gear 36 is in a braking operation, the switching cam 20 and the second switching cam 44 are contactless (FIGS. 2, 7 and 13).

Furthermore, the switching device 17 has a tilting lever mount 21 coupled directly to the switching element 19, the tilting lever mount having a first end position allocated to the firing operation and a second end position allocated to the braking operation. The tilting lever mount 21 is provided for switching the effective connection between the cam shaft 10 and the cam followers 13, 14. The tilting lever mount 21 serves, for example, to mount the tilting levers 22, 23 and, respectively, for the tilting lever 22 and the tilting lever axis 24 and for the tilting lever 23, fixes the tilting lever axis 25 different to the tilting lever axis 24, around which tilting lever axis 25 the corresponding tilting lever 22, 23 is pivotably mounted. The tilting lever axes 24, 25 run in parallel to the rotational axis 40 of the cam shaft 10 (FIGS. 2 to 11).

Figure 12:
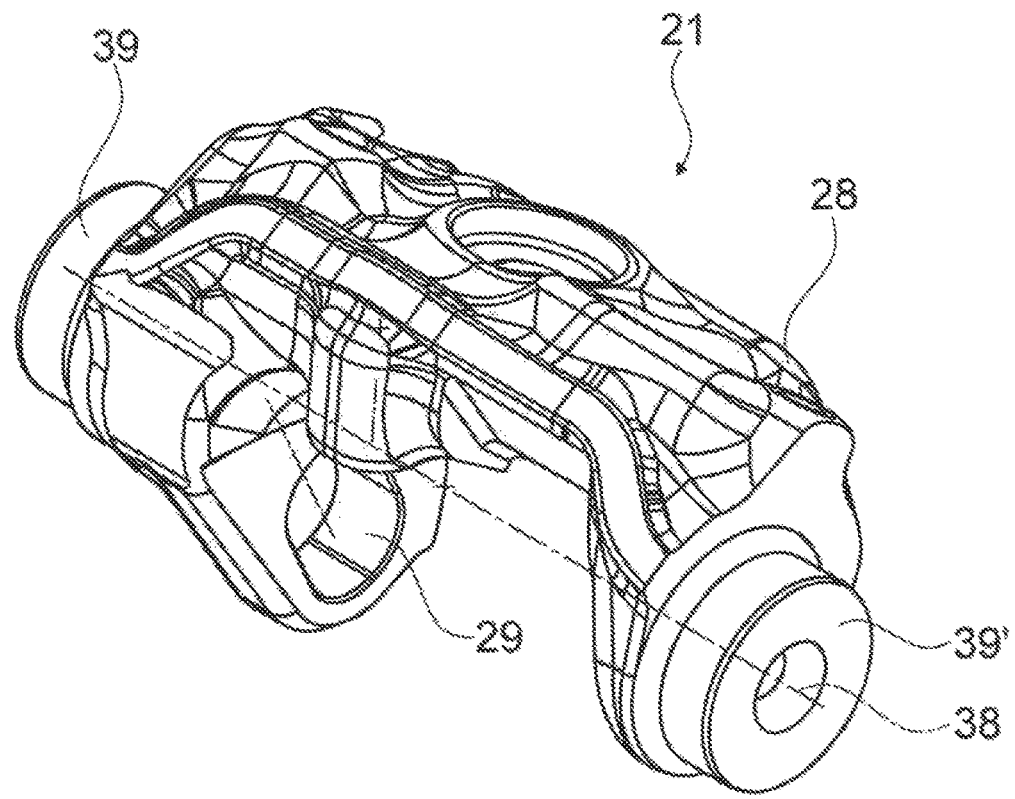
FIG. 12 illustrates a mounting element of a tilting lever mount of a changeover device of the valve gear according to the invention in a perspective depiction.

The tilting lever mount 21 comprises a pivotably mounted mounting element 28. The tilting lever mount 21 comprises a mounting element 28, on which the tilting levers 22, 23 are mounted (c.f. FIGS. 2, 7 and 12). The mounting element 28 itself is pivotably mounted. A mounting axis 38, around which the mounting element 28 can be pivoted, is arranged in parallel to the tilting axes 24, 25. The tilting lever axis 24 and the tilting lever axis 25 are provided offset at an angle in relation to each other around a mounting axis 38 of the mounting element 28. The mounting element 28 is mounted in a housing of the valve gear 36, the housing not being depicted in more detail. The housing is attached to the cylinder head. The mounting element 28 is designed in the shape of a U-shaped frame, wherein ends 39, 39' of the mounting element 28, which are oriented in parallel to the rotational axis 40 of the cam shaft 10, serve to mount around the mounting axis 38, and wherein the tilting levers 22, 23 are attached to a part of the mounting element 28, the part running substantially in parallel to the cam shaft 10. The ends 39, 39' of the mounting element 28 are designed in the shape of mounting spigots and received rotatably in mounts of the housing that are no longer visible. Furthermore, the switching element 19 has two ends 19.1, 19.2 opposite each other. The ends 19.1, 19.2 of the switching element 19 are also formed in the shape of mounting spigots and are received rotatably in further mounts of the housing which are no longer visible. The cam shaft 10 is also rotatably received in mounts of the housing that are no longer visible. It is also conceivable that the cam shaft is rotatably mounted in the cylinder head in the known manner, and the remaining components of the valve gear 36 are received in the housing connected to the cylinder head.

The mounting axis 38 of the mounting element 28 is oriented in parallel offset relative to the rotational axis 40 of the cam shaft 10. In the first end position, the cam follower 13 provided for the firing operation is in contact with the firing cam 11. In contrast, the cam follower 14 provided for the braking operation is raised by the braking cam 12, whereby the braking cam 12 runs through below the cam follower 14 without effect (FIGS. 2 to 6). In the second end position, in contrast, the cam follower 14 provided for the braking operation is in contact with the braking cam 12, while the cam follower 13 provided for the firing operation is raised by the firing cam 11, whereby the firing cam 11 runs through below the cam follower 13 without effect. The position of the respective tilting lever axes 24, 25 in relation to the rotational axis 40 is changed by pivoting the mounting element 28 from one end position into the other end position. While the one tilting lever axis 24, 25 and the tilting lever 22, 23 belonging to this are in the one end position closer to the rotational axis 40 of the cam shaft 10 and provide a contact between the one cam follower 13, 14 having the respective cam 11, 12, the other tilting lever axis 24, 25 and the corresponding tilting lever 22, 23 in the same end position of the mounting element 28 is further removed from the rotational axis 40 of the cam shaft 10, whereby there is no prevailing contact between the other cam follower 13, 14 and the respective cam 11, 12 (FIGS. 7 to 11).

A pivoting movement of the mounting element 28 is limited by two mechanical stops, which define the two end positions of the tilting lever mount 21. With a pivoting movement of the mounting element 28 out of the second end position in the braking operation into the first end position in the firing operation, the stops limit the pivoting movement of the mounting element 28. Correspondingly, the stops limit the pivoting movement of the mounting element 28 out of the first end position in the firing operation into the second end position in the braking operation.

In order to limit the pivoting movement of the mounting element 28, the mounting element 28 of the tilting lever mount 21 has a switching link 29. The switching link 29 extends perpendicularly to the mounting axis 38 of the mounting element 28. The switching link 29 is formed from a straight longitudinal recess. However, in principle, a different design that seems significant to the person skilled in the art would also be possible. The eccentric switching portion 30 of the switching element 19 of the changeover device 17 is guided in the switching link 29. A position of the mounting element 28 is set via the switching link 29. Depending on a pivoting position of the switching element 19, the mounting element 28 is in the first end position or in the second end position. The eccentric switching portion 30 is correspondingly on a first end of the switching link 29 or on the second end of the switching link 29 depending on a rotational position of the switching element 19. In the event of a rotation of the switching element 19, the eccentric switching portion 30 glides through the switching link 29 from one end to the other, wherein here the mounting element 28 is rotated from one end position into the other end position (c.f. FIGS. 3, 5, 8, 10 and 12).

The valve gear 36 has a holding spring 56 for securing the end positions. The holding spring 56 is fixed on the mounting element 28 on its one end 56.1 by means of a holding element 57. The holding element 57 can be designed in a suitable manner, for example in the shape of a head screw. The holding spring 56 applies a spring tension, starting from the mounting element 28 in the direction of the switching portion 30. To do so, the holding spring 56 abuts with its one end 56.2 in a groove 19.3 of the switching portion 30. The groove 19.3 is substantially provided between the mounting element 28 and the switching portion 30, wherein the switching portion 30 is correspondingly held on the first end of the switching link 29 or on the second end of the switching link 29 by means of the spring force of the holding spring 56 depending on the pivoting position of the switching element 19. The holding spring 56 is designed in the shape of a rotational spring, wherein other shapes of a holding spring are also conceivable.

The groove 19.3 is provided as an at least partially peripheral groove on the end of the switching portion 30 opposite the switching cam 43. The switching portion 30 is substantially formed in the shape of a cylinder, wherein the switching portion 30 at least partially passes into the switching cam 43.

The adjustment of the engine braking device is thus not constituted by a locking mechanism and the moment necessary for the adjustment from the mounting forces and the eccentric offset of the tilting lever 22, 23, but via a cinematic coupling of the switching element 10 and the mounting element 28 in such a way that the separate cam contour 18 acts on the switching element 19, which, in the context of an individual step of a Maltese cross transmission, causes a rotation of the mounting element 28. Thus, the movement of the switching element 19 is directly coupled to the movement of the mounting element 28. Furthermore, the switching point in time is no longer coupled to the outlet cam elevation as a result of the presence of a separate switching cam 20, but can be chosen arbitrarily, which constitutes a substantial degree of freedom when shaping the cam. The energy necessary for the switching actuation comes from the cam shaft 10, wherein here not the firing cam 11 via the tilting lever 22 but the switching cam 20 is applied by itself. The triggering is represented by an axial shifting of the switching cam 20 in the cam shaft 10. In the embodiment depicted of the switching actuation of an electro-mechanically actuated decompression engine brake, the switching process is represented by the separate switching can 20, which is on the cam shaft 10, and the switching element 19, which acts as a binding member between the cam shaft housing and the rotatably mounted mounting element 28. As a result of the arrangement of the switching cam 20 and switching element 19, a cinematic coupling between the rotary cam shaft movement, in particular outlet cam shaft movement, and the rotation of the mounting element 28 is produced and thus the dependency is raised by the outlet valve elevation.

Furthermore, the tilting lever mount 21 has two mounting screws 26, 26'. The mounting screws 26, 26' each have a ball head 27, 27' for mounting the tilting levers 22, 23 pivotably around the tilting axis 24, 25. The mounting screws 26, 26' are each allocated to one of the tilting levers 22, 23 and serve to mount the tilting levers 22, 23 on the mounting element 28. The mounting screws 26, 26' are formed identically. However, in principle, an at least partially differing design would also be conceivable. The mounting screws 26, 26' are each formed from a ball head screw. A geometric middle point of the ball head 27, 27' here respectively defines the tilting lever axis 24, 25 of the respective tilting lever 22, 23. The ball heads 27, 27' of the mounting screws 26, 26' each form a ball joint together with a ball head receiver 58, 58' of the allocated tilting lever 22, 23, via which ball joint the corresponding tilting lever 22, 23 is mounted on the tilting lever mount 21. The mounted screws 26, 26' thus constitute the fixed mounting spigot of the ball head 27, 27', i.e., the outer ball, and the respective tilting lever 22, 23 the ball head receiver 58, 58'. The ball head receiver 58, 58' has a peripheral groove 58.1, 58.1' on its upper edge, in which groove a retainer ring 58.2, 58.2' can be inserted. The retainer ring 58.2, 58.2' prevents a detachment of the ball head 27, 27' from the ball head receiver 58, 58'. The rotatably mounted mounting element 28 is provided for receiving the mounting screws 26, 26'. The mounting screws 26, 26' are each formed adjustably for setting the valve clearance to be limited in relation to the mounting element 28. The mounting screws 26, 26' are screwed into the mounting element 28, wherein a screwing-in depth can be changed. The tilting lever axis 24, 25 of the respective tilting lever 22, 23 can be changed via the screwing-in depth in relation to the mounting element 28 and can here set a valve play. The mounting screws 26, 26' can respectively be secured or countered from an unwanted rotation in the mounting element 28 for securing the rotation by means of retainer nut 60, 60'. In order to then carry out the setting of the valve play, the mount central point of the tilting lever 22, 23 now thus shifts the tilting lever axis 24, 25 by means of the respective mounting screws 26, 26' in such a way that the spacing of the respective tilting lever 22, 23 in relation to the cam shaft 10 and the tap on the valve side varies.

The mounting screws 26, 26' each have an oil channel 31. The oil channels 31 are each provided to provide an engine-sided pressure oil supply 48 on the respectively allocated tilting lever 22, 23 depending on a position of the respective mounting screw 26, 26' relative to the respectively allocated tilting lever 22, 23. The oil channels 31 are each provided to provide the engine-sided pressure oil supply 48 at required oil points of the respectively allocated tilting, lever 22, 23, such as a tilting lever roller 46, 47 of the cam follower 13, 14, via which the tilting lever 23, 24 slides on the firing cam 11 or the braking cam 12, or the contact point between the slide shoe 37 and the gas exchange valve 16 depending on a position of the respective mounting screws 26, 26' relative to the respectively allocated tilting lever 22, 23. The mounting screws 26, 26' each produce a connection between the engine-sided pressure oil supply 48 and the tilting lever sided required oil points of the tilting lever roller 46, 47 and of the valve-sided slide shoe contact. The mounting screws 26, 26' are rotated relative to the tilting levers 22, 23 when adjusting the operation manner of the fired and braking operations, which allows a control of the oil inflow as a result of the shape of the oil bore position. In turn, this reduces the overall oil requirement for the tilting lever 22, 23 to the activated tilting lever 22, 23 in the respective operating manner. The tilting levers 22, 23, which are thus not necessary in the current operating state, are excluded from an oil supply. This is carried out, in particular, without additional valves.

Figure 6:
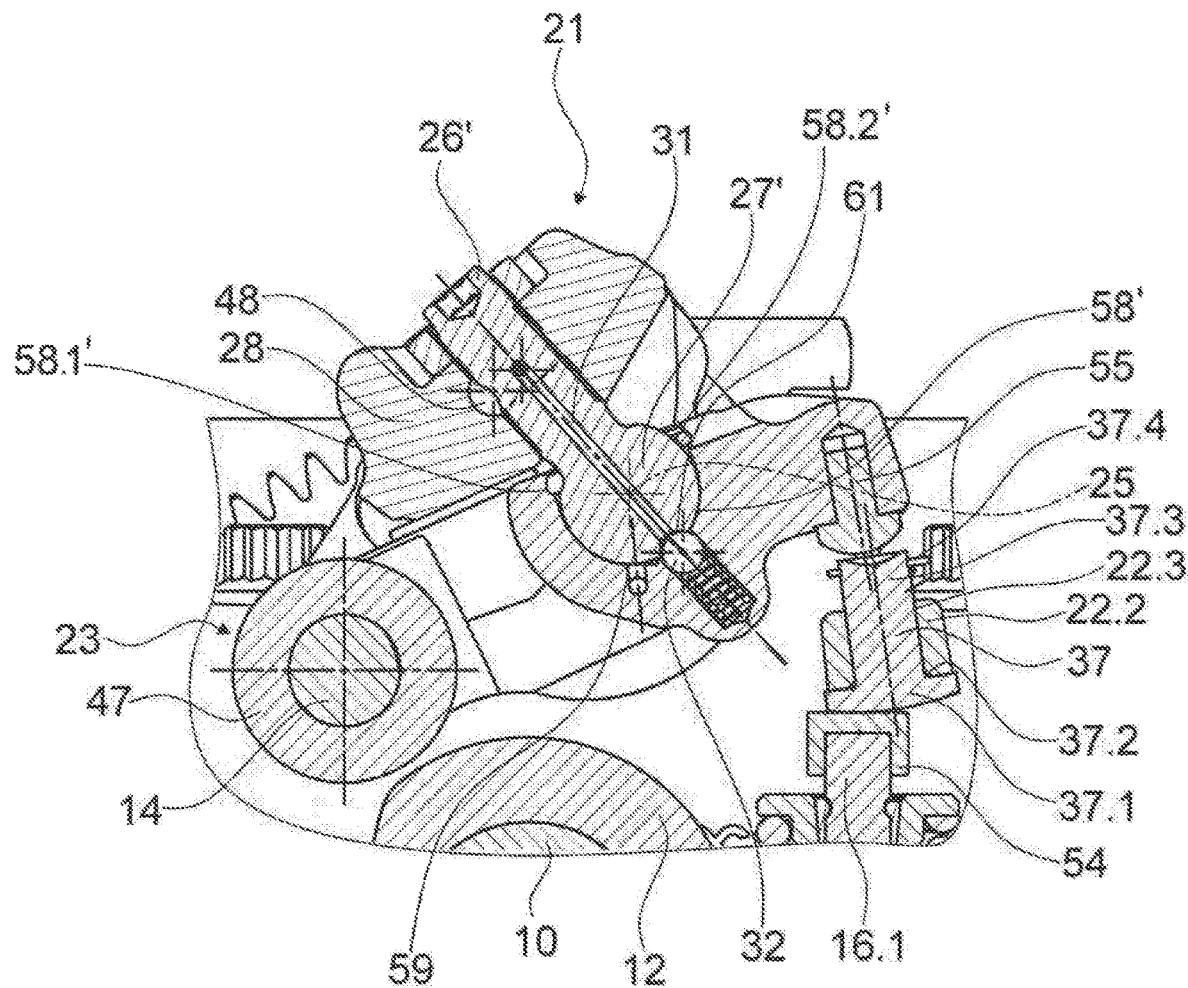
FIG. 6 illustrates the valve gear in a firing operation in a cross-section along the line of intersection VI-VI.
Figure 11:
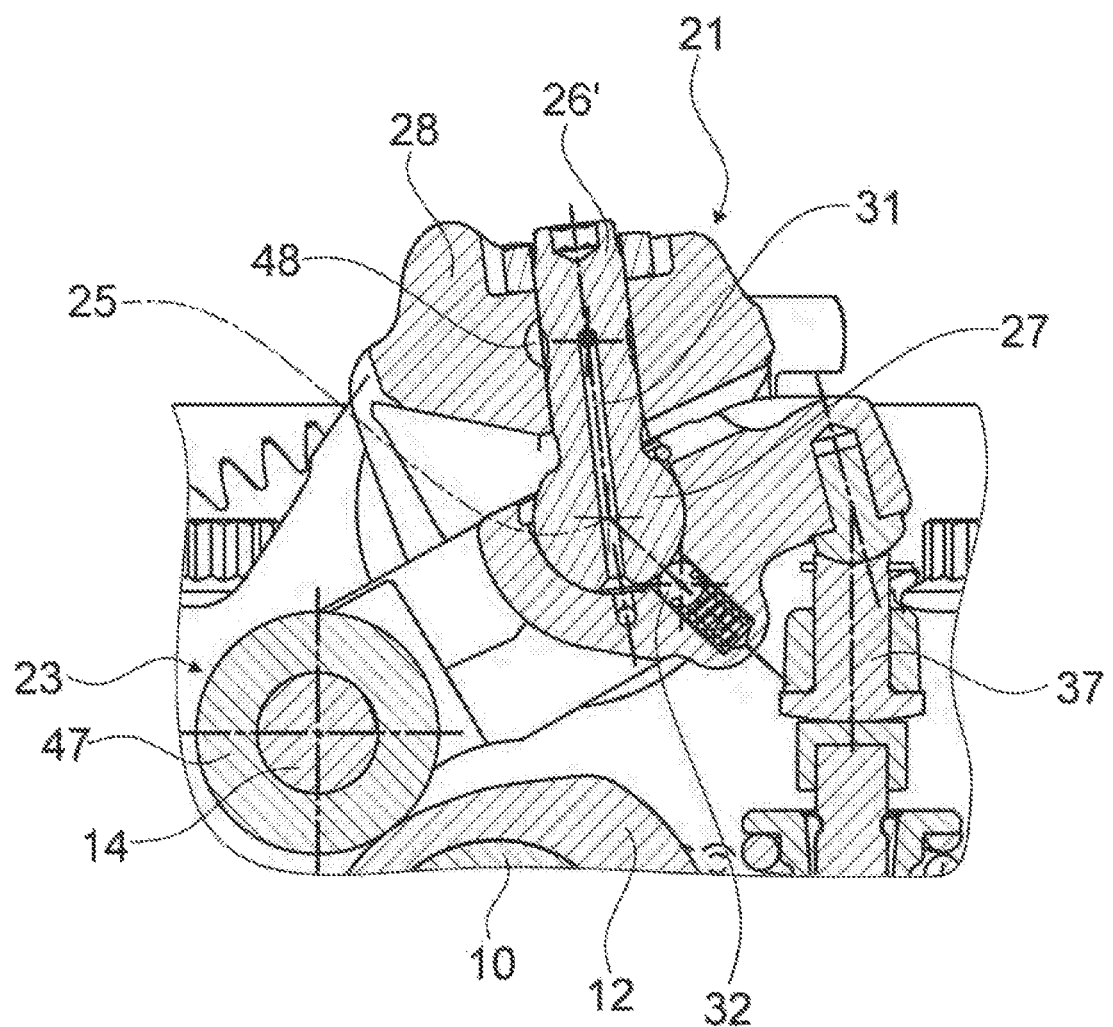
FIG. 11 illustrates the valve gear in a braking operation in a cross-section along the line of intersection XI-XI.

By way of example, FIGS. 6 to 11 show the oil supply of the tilting levers depending on the operating manner of the combustion engine 35. The two Figures show a sectional depiction of the tilting lever 23. In FIG. 6, the mounting element 28 is depicted in its end position for the fired operation. Here, the tilting lever 22 not shown transfers a stroke of the firing cam 11 to the gas exchange valves 15, 16. The tilting lever 23 shown with its cam follower 14 is not in contact with the braking cam 12 and is thus not moved. Furthermore, the pressure oil supply 48 is connected to the oil channel 31 in the mounting screw 26'. A connection to an oil supply line 59 to the required oil points is interrupted by the rotation of the mounting screw 26' in relation to the tilting lever 23. The oil supply line 59 is provided in the ball head receiver 58, 58' substantially opposite the mounting screw 26, 26'. In FIG. 11, the mounting element 28 is depicted in its end position for the braked operation. Here, the tilting lever 22 not shown does not assign any stroke of the firing cam 11 to the gas exchange valves 15, 16, while the tilting lever 23 shown with its cam follower 14 is in contact with the braking can 12 and thus assigns a stroke of the braking cam 12 to the gas exchange valve 16. The pressure oil supply 48 is connected to the oil channel 31 in the mounting screw 26', and the oil channel 31 overlaps the oil supply line 59. In order to ensure a sufficient overlap or congruence of the oil channel 31 and the oil supply line 59 in the event of a movement of the tilting lever 23 and thus to enable a constant oil supply in the event of a tilting movement of the tilting lever 23, the mounting screw 26' has a conical extension 61, opening outwardly, of the oil channel 31 on the end of the oil channel 31 on its ball head 27. The tilting lever 22 for the fired operation is designed analogously to the tilting lever 23.

Furthermore, the tilting lever 23 has a stopping element 32 for the braking operation. The stopping element 32 is provided for stopping the allocated tilting lever 23 relative to the tilting lever mount 21 in at least one position. The stopping element 32 is provided for stopping the tilting lever 23 for the braking operation relative to the respectively allocated mounting screw 26' in a deactivated or fired operation. The stopping element 32 is provided to stop the tilting lever 23 in a firing operation (FIG. 6). The stopping element 32 is formed by a spring loaded ball facing towards the allocated mounting screw 26'. The stopping element 32 is provided next to the oil supply line 59 in the tilting lever 22, 23 in the ball head receiver 58.

However, in principle, a different design that seems significant to the person skilled in the art would also be possible. The stopping of the stopping element 32 can be released non-destructively when applying a defined release force as a result of the switching cam 20, which exceeds a stopping force. The stopping element 32 is provided to hold the tilting lever mount 21 respectively in the first end position. The stopping element 32 is directly integrated in the ball joint between the mounting screws 26' and the tilting lever 23 (c.f. FIGS. 6 and 11).

The stopping element 32 is further provided to shut off an oil flow of the oil channel 31 of the mounting screw 26' in a stopping state. An end, facing towards the tilting lever 23, of the oil channel 31 is here covered directly by the ball of the stopping element 32. The stopping element 32 is provided to latch into the oil channel 31 of the mounting screw 26' in a stopping state. Both a shutting off of the oil channel and a stop take place via the latching. The conical extension 61, opening outwardly, of the oil channel 31 here also forms a corresponding latching cone on the end facing towards the tilting lever 23. The stopping element 32 thus simultaneously shuts off the oil flow in the latched position and releases it again in the activated position (c.f. FIGS. 6 and 11).

The tilting lever 22 for the fired operation is designed analogously to the tilting lever 23.

Figure 14:
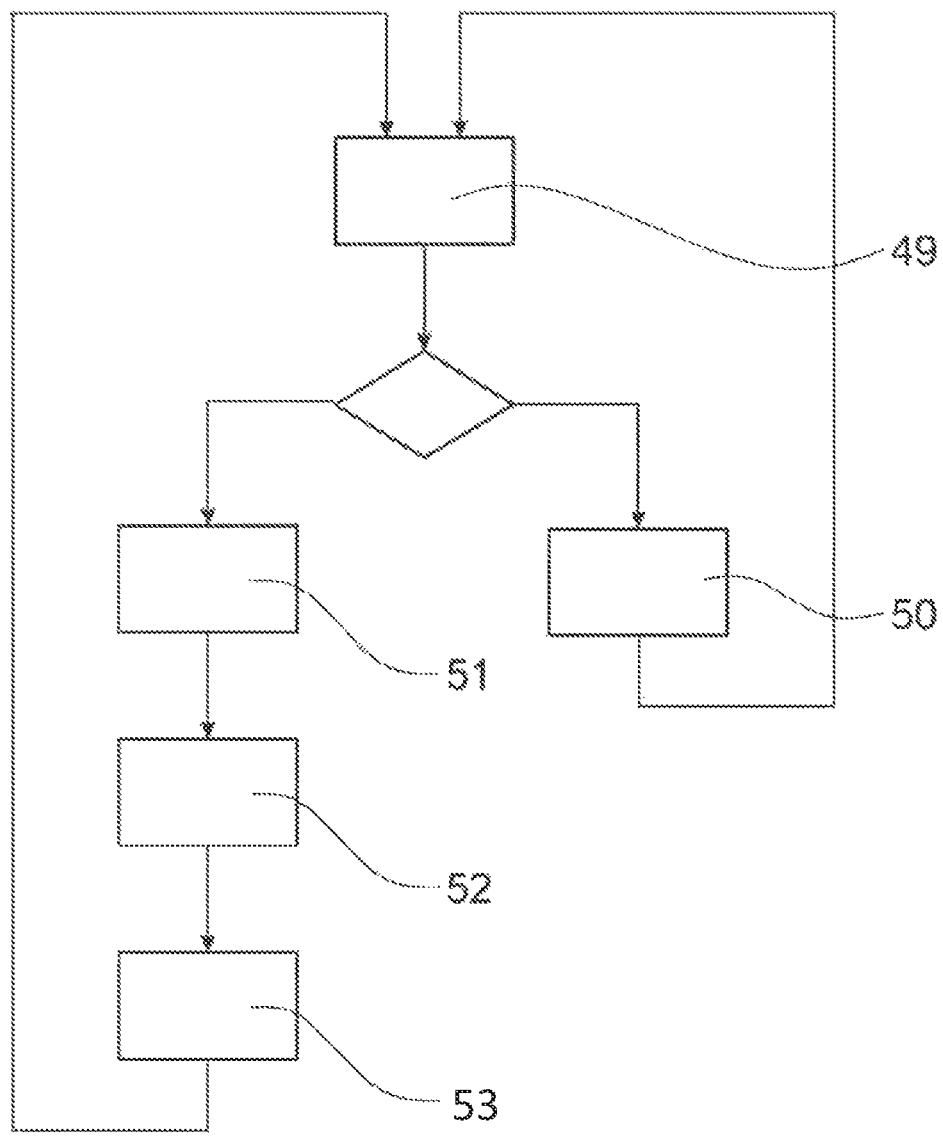
FIG. 14 is a schematic flow chart of a method for an operation of the valve gear according to the invention.

FIG. 14 shows a flow chart of a method for an operation of the valve gear 36. The method is analogous to the description and functionality of the valve gear 36 already explained. In the method, the switching element 19 of the changeover device 17 is acted on for a direct switching between the firing operation and the braking operation by means of the separate cam contour 18 of a cam shaft 10 of the valve gear 36. In the method, the switching cam 20 is brought into a switching position corresponding to the desired operating state, i.e., a braking operation or a firing operation, in a first method step 49. If the valve gear 36 is already in the corresponding operating state, the switching cam 20 and the switching element 19 are contactless in the further method step 50. If the valve gear 36 is still not in the corresponding operating state, the switching cam 20 contacts the corresponding switching cam 43, 44 of the switching element 19 in the event of a rotation of the cam shaft 10 in a second method step 51, which is in the same plane and correspondingly rotates the switching element 19. The mounting element 28 in a third method step 52 changes the end position as a result of the rotation of the switching element 19. Subsequently, the tilting lever 22, 23, which up until now contacted the firing cam 11 or braking cam 12 allocated to it, is lifted off from the firing cam 11 or braking cam 12 allocated to it by tilting the mounting element 28 in a fourth method step 53, and the tilting lever 22, 23, which up until now was lifted off from the firing cam 11 or braking cam 11 allocated to it, is pressed against the firing cam 11 or braking cam 12 allocated to it. Subsequently, a switching between the firing operation and the braking operation is carried out, and the first method step 49 can be repeated.

LIST OF REFERENCE CHARACTERS

10 Cam shaft
10.1 Longitudinal groove
10.2 Hollow space
11 Firing cam
12 Braking cam
13 Cam follower
14 Cam follower
15 Gas exchange valve
16 Gas exchange valve
16.1 End
17 Changeover device
18 Cam contour
19 Switching element
19.1 End
19.2 End
19.3 Groove
20 Switching cam
20.1 Positioning element
21 Tilting lever mount
22 Tilting lever
22.1 End
22.2 End
22.3 Bore
23 Tilting lever
23.1 End
24 Tilting lever axis
25 Tilting lever axis
26 Mounting screw
27 Ball head
28 Mounting element
29 Switching link
30 Switching portion
31 Oil channel
32 Stopping element
33 Motor vehicle
34 Drive wheel
35 Combustion engine
36 Valve drive
37 Slide shoe
37.1 Head
37.2 Portion
37.3 Shaft
37.4 Securing element
38 Mounting axis
39 End
40 Rotational axis
41 Mounting axis
43 Switching cam
44 Switching cam
45 Tilting lever roller
46 Tilting lever roller
47 Tilting lever roller
48 Pressure oil supply
49 Method step
50 Method step
51 Method step
52 Method step
53 Method step
54 Cap
55 Transfer element
56 Holding spring
56.1 End
56.2 End
57 Holding element
58 Ball head receiver
58.1 Groove
58.2 Retainer ring
59 Oil supply line
60 Retainer nut
61 Extension

The invention claimed is:
1. A valve gear, comprising:
a cam shaft which has a cam group including a firing cam and a braking cam;
a first cam follower assigned to the firing cam, wherein the first cam follower in a firing operation actuates a gas exchange valve;
a second cam follower assigned to the braking cam, wherein the second cam follower in a braking operation actuates the gas exchange valve; and
a changeover device with a tilting lever mount, wherein the changeover device switches between the firing operation and the braking operation, wherein the tilting lever mount has a pivotably mounted mounting element on which a first tilting lever belonging to the first cam follower and a second tilting lever belonging to the second cam follower are pivotably mounted;
wherein the tilting lever mount has a first mounting screw with a first ball head and a second mounting screw with a second ball head;
wherein the first ball head and a first ball head receiver of the first tilting lever form a first ball joint via which the first tilting lever is mounted on the tilting lever mount;

wherein the second ball head and a second ball head receiver of the second tilting lever form a second ball joint via which the second tilting lever is mounted on the tilting lever mount;

wherein the mounting element receives the first and the second mounting screws;

wherein the first and the second mounting screws are each formed adjustably for setting a valve play relative to the mounting element.

2. The valve gear according to claim 1, wherein the first and the second mounting screws each have an oil channel and wherein the respective oil channels are connected to a pressure oil supply.

3. The valve gear according to claim 2, wherein a respective oil supply line is disposed in the first and the second ball head receivers and wherein the respective oil supply lines overlap the respective oil channel.

4. A valve gear, comprising:
   a cam shaft which has a cam group including a firing cam and a braking cam;
   a first cam follower assigned to the firing cam, wherein the first cam follower in a firing operation actuates a gas exchange valve;
   a second cam follower assigned to the braking cam, wherein the second cam follower in a braking operation actuates the gas exchange valve; and
   a changeover device with a tilting lever mount, wherein the changeover device switches between the firing operation and the braking operation, wherein the tilting lever mount has a pivotably mounted mounting element on which a first tilting lever belonging to the first cam follower and a second tilting lever belonging to the second cam follower are pivotably mounted;
   wherein the tilting lever mount has a first mounting screw with a first ball head and a second mounting screw with a second ball head;
   wherein the first ball head and a first ball head receiver of the first tilting lever form a first ball joint via which the first tilting lever is mounted on the tilting lever mount;
   wherein the second ball head and a second ball head receiver of the second tilting lever form a second ball joint via which the second tilting lever is mounted on the tilting lever mount;
   wherein the mounting element receives the first and the second mounting screws;
   wherein the first and the second mounting screws each have an oil channel and wherein the respective oil channels are connected to a pressure oil supply;
   wherein a respective oil supply line is disposed in the first and the second ball head receivers and wherein the respective oil supply lines overlap the respective oil channel;
   wherein the first and the second tilting levers each have a respective stopping element, wherein the respective stopping element is formed from a respective spring loaded ball that faces towards the respective mounting screw, and wherein the respective stopping element is disposed next to the respective oil supply line.

5. The valve gear according to claim 4, wherein in a stopping state of the respective stopping element, the stopping element is latched into an end, facing towards the respective tilting lever, of the respective oil channel and covers the respective oil channel.

6. The valve gear according to claim 5, wherein the first and the second mounting screws each have a conical extension opening outwardly of the respective oil channel on the end of the oil channel on the respective ball head.

* * * * *